United States Patent [19]

Prieur et al.

[11] 3,748,407

[45] July 24, 1973

[54] MAGNETIC HEAD POSITIONING MECHANISM WITH LONGITUDINAL ROD AND CAM

[75] Inventors: Lucien Robert Prieur, Ecouen; Hubert Cecyl Albert Rousseau, Meudon, France

[73] Assignee: Societe Industrielle Honeywell Bull (Societe Anonyme), Paris, France

[22] Filed: May 17, 1972

[21] Appl. No.: 255,875

[30] Foreign Application Priority Data

May 25, 1971 France .............................. 7118809

[52] U.S. Cl .................179/100.2 CA, 340/174.1 E, 340/174.1 F

[51] Int. Cl. ............................................. G11b 5/44

[58] Field of Search .......................... 179/100.2 CA; 340/174.1 E, 174.1 F, 174.1 C

[56] References Cited

UNITED STATES PATENTS

| | | | |
|---|---|---|---|
| 3,523,285 | 8/1970 | Alger, Jr. et al. | 340/174.1 E |
| 3,531,788 | 9/1970 | Brown et al. | 340/174.1 E |
| 3,702,997 | 11/1972 | Jamieson | 340/174.1 E |

*Primary Examiner*—Vincent P. Canney
*Attorney*—Ronald T. Reiling et al.

[57] ABSTRACT

A device for moving a plurality of magnetic heads toward or away from a magnetic storage disc wherein a plurality of such heads simultaneously are moved into and out of operative position on each face of the disc, wherein a rod rotatable around its longitudinal axis is coupled to move each of such heads, wherein a rotatable cam is employed to actuate said heads, and wherein a single cam follower apparatus with the cam to provide for rotation of all of such rods.

14 Claims, 3 Drawing Figures

MAGNETIC HEAD POSITIONING MECHANISM WITH LONGITUDINAL ROD AND CAM

BACKGROUND OF THE INVENTION

This invention relates to apparatus for simultaneously moving a plurality of magnetic heads. More particularly, the invention concerns apparatus for simultaneously moving four magnetic heads in the vicinity of a magnetic storage medium. Such medium may be a disc which beads information on its two faces, and two of the heads are disposed on one side of the medium and two on the other side. The purpose of such apparatus is to simultaneously move four magnetic heads toward or away from the respective faces of the storage medium.

The apparatus described above may be mounted on a carriage which is movable parallel to the storage medium and permits the advance and retraction of the set of four heads with respect to the medium. However, such apparatus is especially useful in the case where the heads are so-called "fixed heads"; i.e., the heads are associated with a non-removable magnetic disc and are intended to supply data such as addresses, tables, etc., whose access time must be very short. Such fixed heads usually cover a plurality of tracks of the magnetic disc (for example seven tracks) and the selection of these tracks is made only electronically and not by radial displacement of the heads along the disc.

Devices are known which move magnetic heads in the vicinity to a magnetic medium bearing information on its two faces. Such devices comprise a crank-like member for each magnetic head. The bent end of each crank-like member cooperates with a cam, which has form of a disc driven by rotating shaft. Rotation of the disc drives the crank-like member, which causes an arm located at the other end of the member to revolve around the longitudinal axis of the member. The end of this arm is adapted to press, by means of a spring, against a corresponding magnetic head, which head is mounted elastically relative to the frame of the apparatus.

However, such prior art device exhibits a serious shortcoming. Thus, even if both faces of the disc cam, are appropriately profiled a single cam is able to operate only two crank-like members and, consequently, two magnetic heads. Therefore, if four magnetic heads are to be moved, it is necessary to provide at least two cams in a device of this type. Hence, not only does such a device require a relatively large volume in order to accommodate two cams, but it is also very difficult to fix one cam relative to the other so that the movements of the four magnetic heads are the same.

Accordingly, it is the object of the present invention to remedy these disadvantages of the prior art devices.

SUMMARY OF THE INVENTION

According to the invention, apparatus for simultaneously moving four magnetic heads proximate to a magnetic storage medium, such as a disc bearing information on its two faces, wherein two of such heads are disposed on one side of the storage medium and two heads on the other side of the medium, wherein the heads are simultaneously moved toward or away from the respective faces of the medium between operative and non-operative positions, wherein, for each magnetic head, there is provided a rod rotatable around its longitudinal axis under the action of a cam and the rotation of such rod controls the movement of the associated magnetic head, and wherein the axes of such four rods are parallel, is characterized in that it comprises an assemblage of toothed elements, each attached to one of such rods and meshing with at least one other toothed element, one of such elements being actuated by the aforementioned cam.

Preferably, the assemblage of toothed elements provides that the two rods corresponding to the two magnetic heads disposed on one side of the magnetic storage medium turn simultaneously in opposite directions. Furthermore, the magnetic heads are paired symmetrically in relation to the magnetic medium and the rods symmetrical in relation to such medium preferably turn in opposite directions.

The toothed elements, therefore, may be toothed wheels engaging with one another and each being mounted on one of the rods. Since wheels must be of the same diameter because the movements of the magnetic heads must be the same, it is necessary that the rods form a rectangular parallelopiped (or be of elliptic form, for example) which thereby requires a volume with a large cross-section perpendicular to the plane of the storage medium. In fact, the separation of the heads disposed on opposite sides of the storage medium is imposed by the magnetic medium and cannot be reduced. Furthermore, since the amount of rotation of the rods is relatively small, this is also true of the toothed wheels, particularly since the latter have a large diameter in relation to the rods. Consequently, only the few engaged teeth are utilized. Therefore, there is little need to use toothed wheels, as such.

In the preferred embodiment, each toothed element is an arm orthogonal to the rod on which it is mounted. Each such arm comprises at least a portion of the profile of at least one gear tooth, which portion cooperates with a corresponding portion of another arm. The pitch circle of each tooth portion is centered on the axis of the corresponding rod.

Preferably, in an embodiment which comprises first and second rods associated with magnetic heads disposed on one side of the magnetic medium and third and fourth rods associated with magnetic heads disposed on the other side of the medium, the first and second rods are attached to respective first and second arms, each of such arms comprising two gear tooth portions. In this embodiment the third and fourth rods are attached to respective third and fourth arms, each of these latter arms comprising a single gear tooth portion. The gear tooth portions of the first arm mesh with respective gear tooth portions of the second and fourth arms, whereas the other gear tooth portion of the second arm meshes with the gear tooth portion of the third arm. Elastic means is provided between the third and fourth arms to urge their respective gear tooth portions against the corresponding gear tooth portions of the first and second arms. In this embodiment either of the first or second arms is actuated by the aforementioned cam.

Preferably, the second, third and fourth arms, when in the positions in which the magnetic heads are nonoperative, are substantially perpendicular to the plane of the magnetic recording medium, whereas the first arm is substantially parallel to such plane. If the cam has the form of a disc whose plane is parallel to that of the magnetic medium, it is advantageous that the first arm be actuated by such cam.

The second, third and fourth arms may be identical.

BRIEF DESCRIPTION OF THE DRAWING

The invention will be described with reference to the accompanying drawing, wherein.

DESCRIPTION OF THE PREFERRED EMBODIMENT

Figures 1, 3:
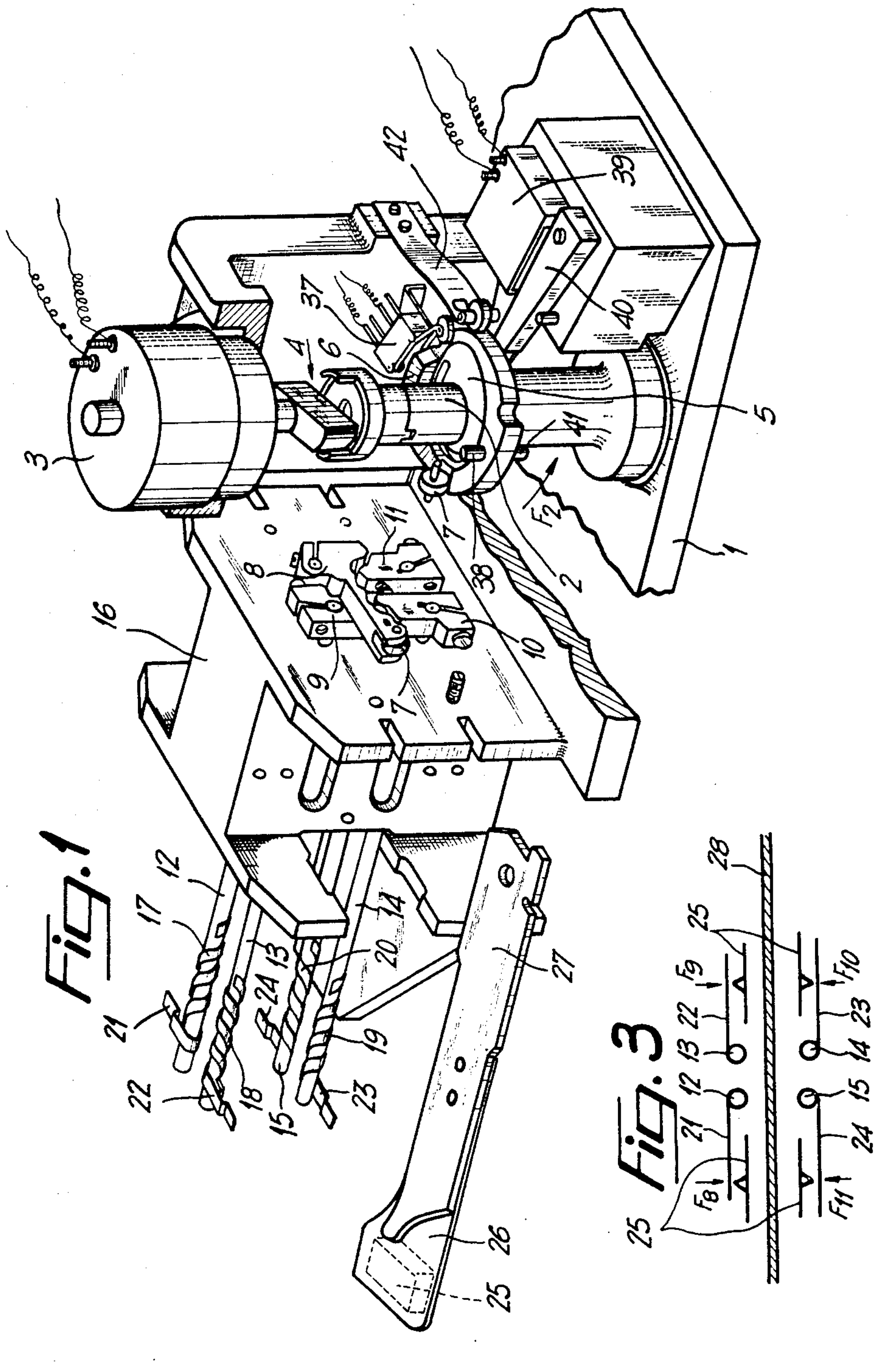
FIG. 1 is a perspective view of one embodiment of the apparatus of the invention, shown as broken into two portions separated from one another.
FIG. 3 is a schematic illustration of the relationship between the four magnetic heads and the magnetic recording medium.

The apparatus of the invention comprises a flat base 1, FIG. 1, which may be attached to a sliding carriage. A rotating shaft 2 is orthogonally mounted on base 1. Shaft 2 is adapted to be turned by an electromagnet 3 and a rotatable armature 4. A disc 5 is held on shaft 2. The upper face of disc 5 bears the profile of a ramp 6, on which a roller 7 is adapted to ride. Roller 7 is mounted at the end of a pivot arm 8, which is clamped to a rod 12 that is adapted to turn on its longitudinal axis. The apparatus further comprises three other pivot arms 9, 10 and 11, which are clamped to respective ones of rods 13, 14 and 15, each of which is adapted to turn on its longitudinal axis. The apparatus of the invention is illustrated in FIG. 1 as broken between disc 5 and the assemblage of arms 8, 9, 10 and 11 in order to better show the latter. Because of this, roller 7 appears twice in FIG. 1.

Rods 12–15 traverse a block 16 through holes which serve as bearings. The ends of rods 12–15 remote from arms 8–11 bear respective ones of springs 17, 18, 19, and 20. Springs 17–20 are wound spirally around respective ones of rods 12–15 and are prolonged by their respective ends 21, 22, 23, and 24.

Magnetic heads 25 are mounted at the tip of respective elastic leafs 26, which, in turn, are attached to a rigid support 27. Support 27 is affixed to block 16. For clarity, only, a single magnetic head 25 with its support 27 separated from block 16 has been shown in FIG. 1. In reality, each of ends 21–24 rests against a leaf 26 for controlling the movement of a respective magnetic head 25. Rods 12 and 13 (and the corresponding heads 25) are disposed on one side of a magnetic recording medium 28 and rods 14 and 15 (and the corresponding heads 25) are disposed on the other side of the medium (see FIG.3). Rods 12 and 13 are respectively symmetrical to rods 15 and 14 relative to medium 28.

Figure 2:
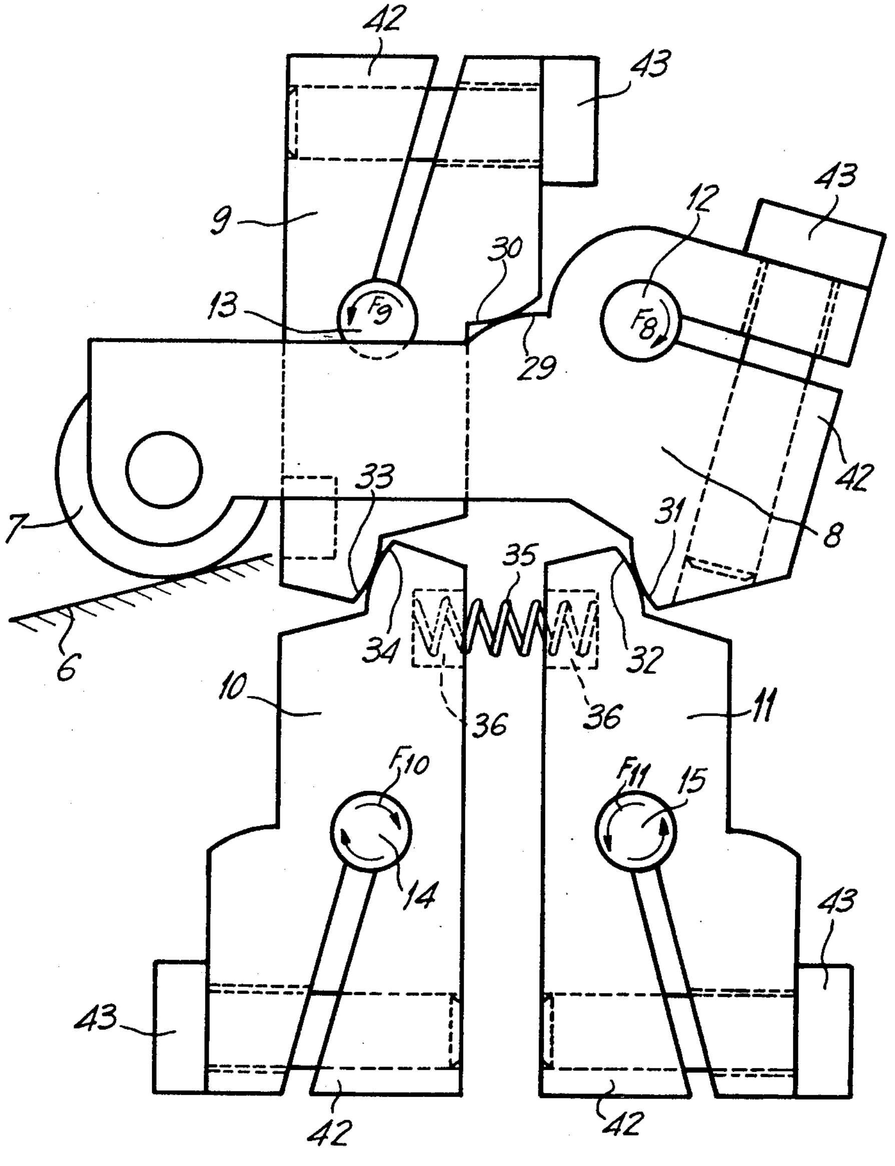
FIG. 2 is a detail view of the apparatus of FIG. 1.

As shown in FIG. 2, arm 8 is substantially parallel to the plane of rods 12 and 13 (and to that of rods 14 and 15), whereas arms 9, 10 and 11 are substantially parallel to the plane of rods 12 and 15 (and to that of rods 13 and 14).

Arm 8 comprises a portion 29, opposite to arm 9, which has the form of the profile of a portion of a gear tooth. Portion 29 engages a similar portion 30 of arm 9. Arm 8 also comprises another portion 31, opposite to arm 11, which has the profile of a portion of a gear tooth and engages with a similar portion 32 of arm 11.

Additionally, arms 9 and 10 are in contact with one another by means of portions 33 and 34, which have the form of gear teeth. The gear tooth portions 29–34 are shaped such that their pitch circles are centered on the axes of the respective ones of rods 12–15 to which the arms which bear such portions are attached.

A compression spring 35 has the ends thereof inserted into facing bores 36 in arms 10 and 11. Spring 35 provides an elastic force for urging the arms 10 and 11 apart from one another and for urging cooperative ones of tooth portions 29–34 against one another. Spring 35 therefore compensates for all play which may exist between such portions.

When electromagnet 3 rotates shaft 2 in the direction of arrow $F_2$ (FIG. 1), roller 7 ascends ramp 6, and, as a result, arm 8 pivots in the direction of arrow $F_8$ (FIG. 2). The cooperation between tooth portions 29 and 30, on the one hand, and tooth portions 31 and 32, on the other hand, thereupon forces arms 9 and 11 to pivot in the respective directions of arrows $F_9$ and $F_{11}$. With pivoting of arm 9, the cooperation between tooth portions 33 and 34 causes the pivoting of arm 10 in the direction of arrow $F_{10}$. Rods 12–15 undergo corresponding rotations so that ends 21–24 thrust magnetic heads 25, against the reaction of elastic leafs 26, toward the faces of magnetic recording medium 28.

When, next, shaft 2 is rotated in the direction opposite to arrow $F_2$ (for example under the action of an electromagnet 39 to be described hereinafter), roller 7 descends ramp 6 and arms 8–11 pivot in directions opposite to their preceding directions of rotation. Heads 25 thereupon return therefore to their initial position under the restoring action of elastic leafs 26, which are no longer stressed by ends 21–24.

As known, the apparatus of the invention also comprise a contact 37 which cooperates with a spur 38 borne by disc 5 so as to signal when the magnetic heads are in the reading or writing position (the position of the heads proximate to medium 28). Similarly, as described in the French patent application P.V.N. 71,03902, an electromagnet 39 may be provided, whose movable armature 40 cooperates with a spur 41 borne by disc 5 for restoring shaft 2 to its initial position after its rotation in the direction of arrow $F_2$. This return of shaft 2 to its initial position may be controlled by a damping member 42a, which comprises an elastic leaf urging a roller against the edge of disc 5.

It is readily apparent that arms 9, 10, and 11 may be identical. In such instance, the tooth portions of arms 10 and 11 that correspond to the tooth portion 30 of arm 9 are not utilized. Therefore, 9, 10, and 11 can be fabricated by cutting a profile of appropriate section.

For clamping to respective ones of rods 12–15, each of arms 8–11 may comprise at one end thereof an elastic yoke 42 surrounding such rod and being clamped thereto by means of a screw 43.

We claim:

1. Apparatus for simultaneously moving four magnetic heads proximate to a magnetic disc storage medium bearing information on its two faces, wherein two of said heads are disposed on one side of said medium and two of said heads on the other side of said medium, wherein said heads are simultaneously moved toward or away from the respective faces of said medium between operative and nonoperative positions, wherein, for each of said heads, there is provided a rod rotatable around its longitudinal axis under the action of a cam and the rotation of said rod controls the movement of the corresponding one of said heads, and wherein the axes of said four rods are parallel, wherein the improvement comprises: an assemblage of toothed elements, each of said elements being attached to one of said rods and meshing with at least one other of said elements, one of said elements being actuated by said cam.

2. The apparatus of claim 1, wherein said assemblage of toothed elements is disposed such that two of said rods corresponding to two of said magnetic heads disposed on one side of said magnetic medium turn simultaneously in opposite directions.

3. The apparatus of claim 1, wherein said assemblage of toothed elements is disposed such that two of said rods symmetrical relative to said magnetic medium turn in opposite directions.

4. The apparatus of claim 1, wherein said toothed elements comprise toothed wheels meshing with one another, and wherein each of said wheels is mounted on one of said rods.

5. The apparatus of claim 1, wherein each of said toothed elements comprises an arm orthogonal to one of said rods and affixed thereto, each of said arms comprising at least a portion of the profile of at least one gear tooth cooperating with a corresponding portion of another of said arms, and wherein the pitch circle of each of said tooth portions is centered on the axis of the corresponding rod.

6. The apparatus of claim 5, wherein first and second of said rods are associated with said heads disposed on one side of said magnetic medium and third and fourth of said rods are associated with said heads disposed on the other side of said medium, wherein said first and second rods are attached to respective first and second ones of said arms, each of said first and second arms comprising two gear tooth portions, wherein said third and fourth rods are attached to respective third and fourth ones of said arms, each of said third and fourth arms comprising one gear tooth portion, the gear tooth portions of said first arm meshing with respective gear tooth portions of said second and fourth arms, the other gear tooth portion of said second arm meshing with the gear tooth portion of said third arm, and wherein elastic means is provided between said third and fourth arms for urging the gear tooth portions of said third and fourth arms against the corresponding gear tooth portions of said first and second arms.

7. The apparatus of claim 6, wherein one of said first and second arms is actuated by said cam.

8. The apparatus of claim 6, wherein said second, third and fourth arms are substantially perpendicular to the plane of said magnetic disc medium and said first arm is substantially parallel to said plane, when said second, third and fourth arms are in the positions in which said magnetic heads are nonoperative.

9. The apparatus of claim 7, wherein said cam has the form of a disc whose plane is parallel to that of the magnetic disc medium, and wherein said first arm is actuated by said cam.

10. The apparatus of claim 5, wherein three of said arms are substantially alike and wherein only one of the tooth portions of each of two of said three arms is employed.

11. The apparatus of claim 8, wherein said second, third and fourth arms are substantially alike, and wherein only one of the tooth portions of each of said third and fourth arms is employed.

12. Apparatus for simultaneously moving a plurality of magnetic heads toward or away from a magnetic recording medium, comprising: a plurality of rods mounted for rotation around their respective longitudinal axes, means for coupling each of said rods to one of said magnetic heads to provide movement of said head when the corresponding rod rotates, a rotating cam, an element affixed to each of said rods, said elements being mutually engaged for rotating all of said rods in response to rotation of one of said rods, and a cam follower mounted on one of said elements and disposed to follow said cam to provide for rotating the one of said rods to which said one element is affixed.

13. The apparatus of claim 12, wherein all of said rods are parallel.

14. The apparatus of claim 13, wherein said magnetic recording medium comprises a pair of opposed plane faces, and wherein a plurality of said magnetic heads are disposed opposite each of said faces.

* * * * *